(12) United States Patent
Zhao et al.

(10) Patent No.: US 12,045,580 B2
(45) Date of Patent: Jul. 23, 2024

(54) TRANSLATION PEN AND CONTROL METHOD THEREFOR

(71) Applicant: BOE TECHNOLOGY GROUP CO., LTD., Beijing (CN)

(72) Inventors: Jibo Zhao, Beijing (CN); Xingqun Jiang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 470 days.

(21) Appl. No.: 17/423,413

(22) PCT Filed: Jul. 28, 2020

(86) PCT No.: PCT/CN2020/105026
§ 371 (c)(1),
(2) Date: Jul. 15, 2021

(87) PCT Pub. No.: WO2021/018110
PCT Pub. Date: Feb. 4, 2021

(65) Prior Publication Data
US 2022/0076042 A1  Mar. 10, 2022

(30) Foreign Application Priority Data
Jul. 29, 2019 (CN) .......................... 201910690400.2

(51) Int. Cl.
*G06K 9/36* (2006.01)
*G06F 40/284* (2020.01)
(Continued)

(52) U.S. Cl.
CPC ............ *G06F 40/58* (2020.01); *G06F 40/284* (2020.01); *G06F 40/40* (2020.01); *G06F 40/47* (2020.01);
(Continued)

(58) Field of Classification Search
CPC ........ G06V 10/10; G06V 10/12; G06V 10/17; G06V 10/20; G06V 10/22; G06V 10/235;
(Continued)

(56) References Cited

U.S. PATENT DOCUMENTS 6,704,699 B2 *  3/2004  Nir ....................... G06V 30/142
704/4
8,638,319 B2 *  1/2014  Edgecomb ............ G06F 3/0488
345/179
(Continued)

FOREIGN PATENT DOCUMENTS

CN   102169541 A   8/2011
CN   107220242 A   9/2017
(Continued)

OTHER PUBLICATIONS

The First Office Action of Priority Application No. CN 201910690400.2 issued by the Chinese Patent Office on Jul. 20, 2021.
(Continued)

*Primary Examiner* — Eric Rush
(74) *Attorney, Agent, or Firm* — IP & T GROUP LLP

(57) ABSTRACT

A translation pen includes: a pen body, an indication component, an image collector and a first processor. The pen body has a pen tip end. The indication component is arranged on the pen tip end. The image collector is arranged on the pen body, and the image collector is configured to: collect an image including a text to be translated according to a position indicated by the indication component, and send the image collected. The first processor is arranged in the pen body and electrically connected to the image collector, and the first processor is configured to: receive the image sent by the image collector, and recognize the text to be translated in the image.

16 Claims, 10 Drawing Sheets

(51) Int. Cl.
*G06F 40/40* (2020.01)
*G06F 40/47* (2020.01)
*G06F 40/58* (2020.01)
*G06V 10/10* (2022.01)
*G06V 10/22* (2022.01)
*G06V 30/14* (2022.01)
*G06V 30/142* (2022.01)
*G06V 30/148* (2022.01)
*G06V 30/242* (2022.01)

(52) U.S. Cl.
CPC .............. *G06V 10/17* (2022.01); *G06V 10/22* (2022.01); *G06V 10/235* (2022.01); *G06V 30/142* (2022.01); *G06V 30/1444* (2022.01); *G06V 30/1456* (2022.01); *G06V 30/148* (2022.01); *G06V 30/158* (2022.01); *G06V 30/242* (2022.01)

(58) Field of Classification Search
CPC ........ G06V 10/25; G06V 10/26; G06V 10/70; G06V 20/62; G06V 30/00; G06V 30/10; G06V 30/14; G06V 30/142; G06V 30/1437; G06V 30/1444; G06V 30/1448; G06V 30/1456; G06V 30/147; G06V 30/148; G06V 30/153; G06V 30/158; G06V 30/16; G06V 30/186; G06V 30/19; G06V 30/222; G06V 30/242; G06F 40/10; G06F 40/20; G06F 40/205; G06F 40/216; G06F 40/279; G06F 40/284; G06F 40/289; G06F 40/40; G06F 40/47; G06F 40/51; G06F 40/55; G06F 40/56; G06F 40/58

USPC ....... 382/100, 103, 112, 114, 161, 164, 169, 382/171–173, 175–179, 181, 185–189, 382/198, 224, 229, 276, 282, 286, 290, 382/292, 312–314, 321, 325; 704/2, 3, 5; 345/179; 715/256, 262–265, 268, 270
See application file for complete search history.

(56) References Cited

U.S. PATENT DOCUMENTS

| | | | |
|---|---|---|---|
| 9,692,929 B2* | 6/2017 | De Muelenaere | G06V 30/1475 |
| 10,127,673 B1* | 11/2018 | Ben Khalifa | G06V 30/414 |
| 10,255,278 B2* | 4/2019 | Kim | G06F 3/04842 |
| 2011/0188783 A1* | 8/2011 | Minoni | G09B 21/006 |
| | | | 382/314 |
| 2013/0103383 A1* | 4/2013 | Du | G06F 40/58 |
| | | | 704/3 |
| 2014/0081619 A1 | 3/2014 | Solntseva et al. | |
| 2016/0203124 A1* | 7/2016 | Cuthbert | G06V 30/127 |
| | | | 704/2 |
| 2017/0177189 A1* | 6/2017 | Anvari | G06V 30/142 |
| 2019/0182402 A1* | 6/2019 | Shriesher | G06F 40/53 |

FOREIGN PATENT DOCUMENTS

| | | |
|---|---|---|
| CN | 107992867 A | 5/2018 |
| CN | 109263362 A | 1/2019 |
| CN | 110874957 A | 3/2020 |

OTHER PUBLICATIONS

The Second Office Action of Priority Application No. CN 201910690400.2 issued by the Chinese Patent Office on Dec. 28, 2021.

* cited by examiner important st
that CNN is

FIG. 13 important st
that CNN is
          21

FIG. 14 important st
that CNN is
          22

FIG. 15

TRANSLATION PEN AND CONTROL METHOD THEREFOR

CROSS-REFERENCE TO RELATED APPLICATIONS

This application is a national phase entry under 35 USC 371 of International Patent Application No. PCT/CN2020/105026 filed on Jul. 28, 2020, which claims priority to Chinese Patent Application No. 201910690400.2, filed on Jul. 29, 2019, which are incorporated herein by reference in their entirety.

TECHNICAL FIELD

The present disclosure relates to the technical field of translation devices, and in particular, to a translation pen and a control method therefor.

BACKGROUND

A scanning translation pen may scan a printed text into a text recognition system thereof using a scanning technique, so that the text recognition system may recognize the scanned text, and then the recognized text may be translated by a translation software in the pen.

Specifically, the scanning translation pen has a brush-like pen tip, which may be put on a book page and brush the book in a row direction of a printed text on the book page, so as to scan the printed text for translation.

However, the scanning translation pen scans the text row by row in the scanning process, which may block the text to be scanned on the same line, and affect the reader's impression. In addition, a scanning amount cannot be well controlled in such a scanning mode, which may easily lead to an inaccurate translation due to an excessive scanning amount.

SUMMARY

In one aspect, a translation pen is provided. The translation pen includes a pen body, an indication component, an image collector and a first processor. The pen body has a pen tip end. The indication component is arranged on the pen tip end of the pen body. The image collector is arranged on the pen body. The image collector is configured to: collect an image including a text to be translated according to a position indicated by the indication component, and send the collected image including the text to be translated. The first processor is arranged in the pen body, and is electrically connected to the image collector. The first processor is configured to receive the image including the text to be translated sent by the image collector, and recognize the text to be translated in the image.

In some embodiments, the pen body further has a pen tail end opposite to the pen tip end. The image collector is arranged on a side face of the pen body, and in a direction pointing from the pen tip end to the pen tail end of the pen body, the image collector is farther away from the pen tip end than the indication component. The indication component is arranged within a viewing angle range of the image collector.

In some embodiments, the image collector and the indication component have a spacing therebetween.

In some embodiments, the indication component is capable of coloring.

In some embodiments, the indication component has a tip.

In some embodiments, the first processor is further configured to: detect the image including the text to be translated to form at least one text box, the text box containing partial text in the image including the text to be translated; and lock a text box that meets a setting requirement from the at least one formed text box, and take a text in the text box locked as the text to be translated. The setting requirement is such that, in a column direction of the text, a row where the text box is located is a row closest to the indication component; and in a row direction of the text, a symmetric line of the text box is closest to a symmetric line of the image including the text to be translated. Or the indication component is capable of coloring, the setting requirement is that in a column direction of the text, a row where the text box is located is the row closest to the indication component, and at least part of a region in the text box is colored.

In some embodiments, the first processor further configured to: calculate a threshold value of a spacing distance between adjacent letters in the text to be translated according to a size of the locked text to be translated, and perform word segmentation on the locked text to be translated according to the threshold value.

In some embodiments, the translation pen further includes a second processor arranged in the pen body, and the second processor is electrically connected to the first processor. The second processor is configured to: receive the text to be translated recognized by the first processor, translate the text to be translated to generate a translation result, and send the translation result.

In some embodiments, the pen body is provided with an observation window thereon. The translation pen further includes a display screen arranged in the observation window of the pen body, and the display screen is electrically connected to the second processor. The display screen is configured to: receive the translation result sent by the second processor, and display the translation result.

In another aspect, a control method applied to the above translation pen is provided. The control method includes: collecting, by the image collector of the translation pen, an image including a text to be translated according to a position indicated by the indication component of the translation pen; and recognizing, by the first processor of the translation pen, the text to be translated in the image.

In some embodiments, recognizing, by the first processor, the text to be translated in the image includes: detecting the image including the text to be translated to form at least one text box, the text box containing partial text in the image including the text to be translated; and locking a text box that meets a setting requirement from the at least one formed text box, and taking a text in the locked text box as the text to be translated.

In some embodiments, locking the text box that meets the setting requirement from the at least one formed text box includes: selecting a text row closest to the indication component in a column direction of the text; determining a symmetric line of each text box in the text row selected, and a symmetric line of the image including the text to be translated; and locking a text box whose symmetric line is closest to the symmetric line of the image including the text to be translated.

In some embodiments, the indication component is capable of coloring; locking the text box that meets the setting requirement from the at least one formed text box includes: selecting a text row closest to the indication component in a column direction of the text; and locking a text box in which at least part of a region is colored.

In some embodiments, after the text in the locked text box is taken as the text to be translated, the control method further includes: performing a self-adaptive word segmentation on the text to be translated.

In some embodiments, performing the self-adaptive word segmentation on the text to be translated includes: obtaining bounding sub-text boxes of all letters in the text to be translated; determining a reference text box according to areas of the sub-text boxes; calculating a threshold value of a spacing distance between two adjacent letters according to a width of the reference text box; obtaining a value of an actual spacing distance between every two adjacent letters; and performing the word segmentation on the text to be translated according to the value of the actual spacing distance between every two adjacent letters and the threshold value of the spacing distance.

In some embodiments, determining the reference text box according to the areas of the sub-text boxes includes: selecting a sub-text box whose area value is within an intermediate range from the areas of the sub-text boxes, and taking the selected sub-text box as the reference text box. A difference between a lower limit value of the intermediate range and a minimum area value of the sub-text boxes is approximately equal to a difference between an upper limit value of the intermediate range and a maximum area value of the sub-text boxes.

In some embodiments, calculating the threshold value of the spacing distance between the two adjacent letters according to the width of the reference text box includes: calculating the threshold value of the spacing distance between two adjacent letters according to a following formula:

$$N = 0.6 \times \frac{W}{16}.$$

N is the threshold value of the spacing distance between the two adjacent letters, and W is a ratio of the width of the reference text box to a width of a unit pixel in the image.

In some embodiments, performing the word segmentation on the text to be translated according to the value of the actual spacing distance and the threshold value of the spacing distance between every two adjacent letters includes: determining whether the value of the actual spacing distance between two adjacent letters is greater than the threshold value; if the value of the actual spacing distance is greater than the threshold value of the spacing distance, determining that the two adjacent letters belong to two adjacent words, respectively; and if the value of the actual spacing distance is less than or equal to the threshold value of the spacing distance, determining that the two adjacent letters belong to a same word.

In some embodiments, the translation pen further includes a second processor and a display screen. After the first processor recognizes the text to be translated in the image, the control method further includes: translating, by the second processor, the text to be translated recognized by the first processor to generate a translation result; and displaying, by the display screen, the translation result.

In some embodiments, the control method further includes: if the second processor fails to generate the translation result, re-recognizing, by the first processor, another text to be translated in the image, the re-recognized text to be translated being not a text to be translated that recognized latest.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art may obtain other drawings according to these drawings. In addition, the accompanying drawings to be described below may be regarded as schematic diagrams, and are not limitations on an actual size of a product, an actual process of a method and an actual timing of a signal involved in the embodiments of the present disclosure.

FIGS. 12 to 15 are schematic diagrams of respective steps of a self-adaptive word segmentation, in accordance with some embodiments of the present disclosure.

DETAILED DESCRIPTION

Figure 1:
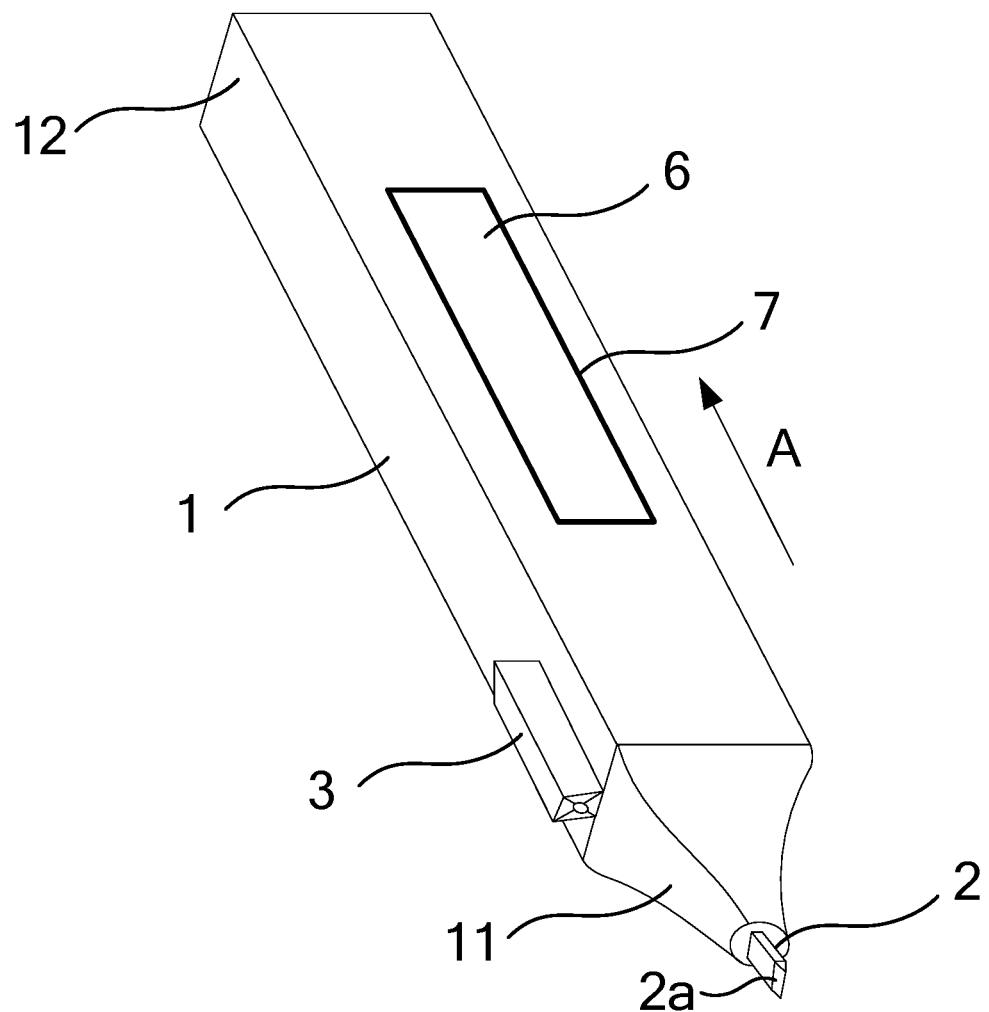
FIG. 1 is a diagram illustrating a structure of a translation pen, in accordance with some embodiments of the present disclosure.

Technical solutions in some embodiments of the present disclosure will be described below clearly and completely with reference to accompanying drawings. Obviously, the described embodiments are merely some but not all embodiments of the present disclosure. All other embodiments obtained based on the embodiments of the present disclosure by a person of ordinary skill in the art shall be included in the protection scope of the present disclosure.

Unless the context requires otherwise, throughout the description and the claims, the term "comprise" and other forms thereof such as the third-person singular form "comprises" and the present participle form "comprising" are construed as open and inclusive, i.e., "including, but not limited to." In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Hereinafter, the terms "first" and "second" are only used for descriptive purposes, and are not to be construed as indicating or implying the relative importance or implicitly indicating the number of indicated technical features. Thus, a feature defined by "first" or "second" may explicitly or implicitly include one or more of the features. In the description of the embodiments of the present disclosure, "a plurality of/the plurality of" means two or more unless otherwise specified.

In the description of some embodiments, the terms "coupled" and "connected" and their extensions may be used. For example, the term "connected" may be used in the description of some embodiments to indicate that two or more components are in direct physical or electrical contact with each other. For another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the contents herein.

The phrase "A and/or B" includes the following three combinations: only A, only B, and a combination of A and B.

The use of the phrase "applicable to" or "configured to" means an open and inclusive expression, which does not exclude devices that are applicable to or configured to perform additional tasks or steps.

The term "about" or "approximately" as used herein includes a stated value and an average value within an acceptable range of deviation of a particular value. The acceptable range of deviation is determined by a person of ordinary skill in the art in view of the measurement in question and the error associated with the measurement of a particular quantity (i.e., the limitations of the measurement system).

Figure 2:
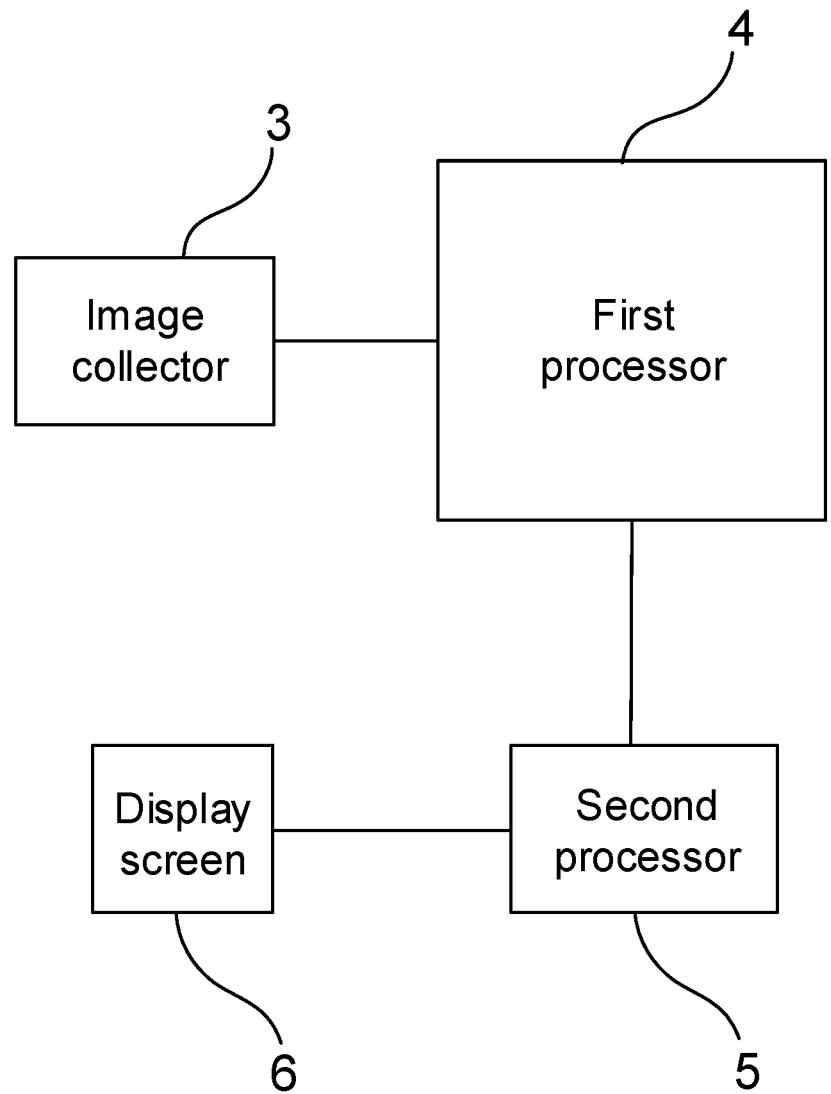
FIG. 2 is a schematic connection diagram of respective devices in a translation pen, in accordance with some embodiments of the present disclosure.

Some embodiments of the present disclosure provide a translation pen. As shown in FIGS. 1 and 2, the translation pen 100 includes a pen body 1 for encapsulation, an indication component 2 and an image collector 3 that are arranged on the pen body 1, and a first processor 4 that is arranged in the pen body (referring to FIG. 2).

The pen body 1 of the translation pen 100 has a pen tip end 11, and a pen tail end 12 opposite to the pen tip end 11. The indication component 2 is arranged on the pen tip end 11 of the pen body 1. For example, the pen tip end 11 has a mounting hole, and the indication component 2 is arranged on the pen tip end 11 through the mounting hole. The indication component 2 is configured to indicate a position where an image including a text to be translated is located.

The image collector 3 is configured to: collect the image including the text to be translated according to the position indicated by the indication component 2, and send the collected image including the text to be translated. For example, the image collector 3 may be an electronic device with an image collection function, such as a camera.

The first processor 4 is electrically connected to the image collector 3. The first processor 4 is configured to: receive the image including the text to be translated sent by the image collector 3, and recognize the text to be translated in the image.

The "text to be translated" may be a text printed on a book page or a text displayed on an electronic display device. In addition, the "text to be translated" may be English letter(s) and/orword(s), and embodiments of the present disclosure are not limited thereto.

In the translation pen 100 provided by the above embodiments of the present disclosure, the indication component 2 is arranged on the pen tip end 11 of the pen body 1, the image collector 3 is arranged on the pen body 1, and the indication component 2 and the image collector 3 are arranged separately, which may prevent the pen tip end 11 of the pen body 1 from blocking the image including the text to be translated collected by the image collector 3. In addition, the position of the image including the text to be translated is indicated by the indication component 2, the image including the text to be translated is collected by the image collector 3 according to the position indicated by the indication component 2, and the text to be translated in the collected image including the text to be translated is recognized by the first processor 4, which may improve accuracy of the image collected by the image collector 3 and avoid collecting redundant images, thereby facilitating the first processor 4 to accurately recognize the text to be translated and improving translation accuracy of the translation pen 100.

In some embodiments, as shown in FIG. 1, the image collector 3 is arranged on a side outside the pen body 1, for example, the image collector 3 is fixed on a side wall of the pen body 1. In addition, in a direction A from the pen tip end 11 pointing to the pen tail end 12 of the pen body 1, the image collector 3 is farther away from the pen tip end 11 than the indication component 2, and the indication component 2 is ensured to be arranged within a viewing angle range of the image collector 3. In this way, it may be ensured that the image collector 3 collects the image including the text to be translated indicated by the indication component 2.

Figure 4:
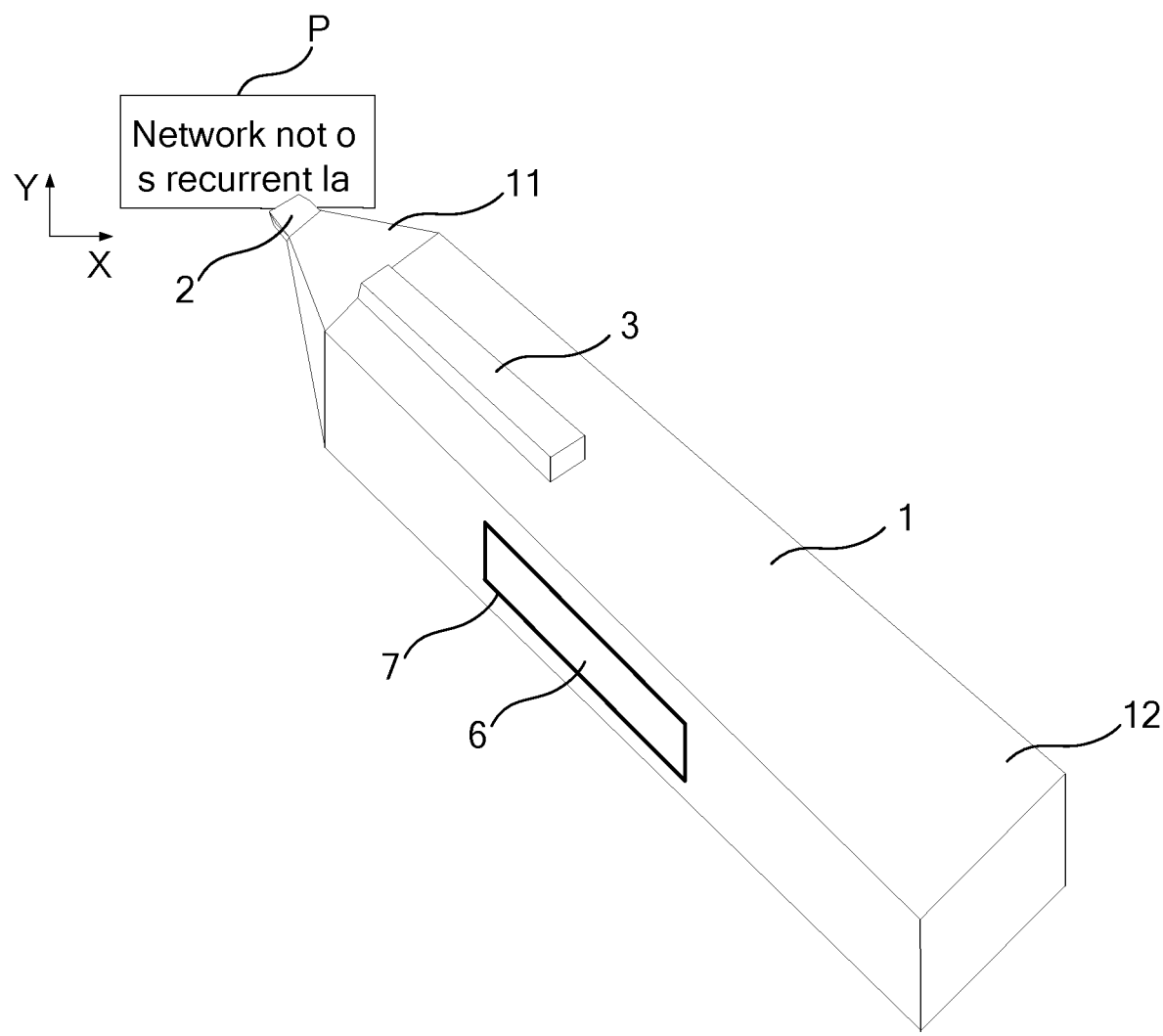
FIG. 4 is a schematic diagram illustrating how to use a translation pen, in accordance with some embodiments of the present disclosure.

For example, as shown in FIGS. 1 and 4, the pen tip end 11 of the pen body 1 is in a shape of a frustum of a quadrangular pyramid or similar to a frustum of a quadrangular pyramid. The frustum of the quadrangular pyramid has two surfaces opposite to each other, one surface has a large area and is integrally formed with the pen body 1, and the other surface has a small area. The indication component 2 is fixed at the other surface of the frustum of the quadrangular pyramid, and a lens of the image collector 3 is located at or proximate to a joint of the frustum of the quadrangular pyramid and a main body portion of the pen body 1, so that it is ensured that the indication component 2 is within the viewing angle range of the image collector 3, thereby enabling the image collector 3 to collect the image including the text to be translated according to the position indicated by the indication component 2.

For example, there is a distance between the image collector 3 and the indication component 2. In a case where the viewing angle range of the image collector 3 is certain, the distance between the image collector 3 and the indication component 2 may ensure that a size of the image collected by the image collector 3 meets size requirements.

In some embodiments, the pen body 1 of the translation pen 100 is also provided with a switch button or a controller electrically connected to the first processor 4, which may be used to control the image collector 3 to collect images.

In some embodiments, as shown in FIGS. 1 and 4, the indication component 2 may be used to color an external object. The indication component 2 may be used to color the text to be translated, so that the image collector 3 may accurately collect the image including the text to be translated. In this case, the indication component 2 may be a pen tip of a highlighter or a color pen, and may perform same operations as a conventional pen, such as drawing, coloring and marking.

Figure 7:
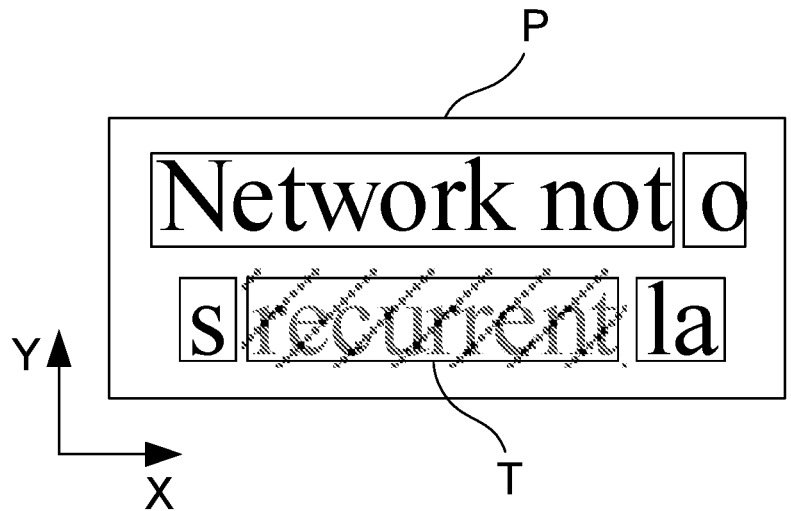
FIG. 7 is a schematic diagram illustrating that another translation pen locks a text to be translated, in accordance with some embodiments of the present disclosure.

It will be noted that, as shown in FIG. 7, a color colored by the indication component 2 (the color of the region where "recurrent" is located in the figure) is different from a printing color of the text to be translated.

For example, as shown in FIG. 1, the indication component 2 has a tip 2a. Compared with a pen tip of a scanning translation pen, which has a brush-like appearance, since the indication component 2 mounted on the translation pen 100 in the embodiments of the present disclosure has a tip 2a of a small size, when the indication component 2 indicates the position where the image including the text to be translated is located, the indication component 2 may not block the image including the text to be translated.

Figure 3:
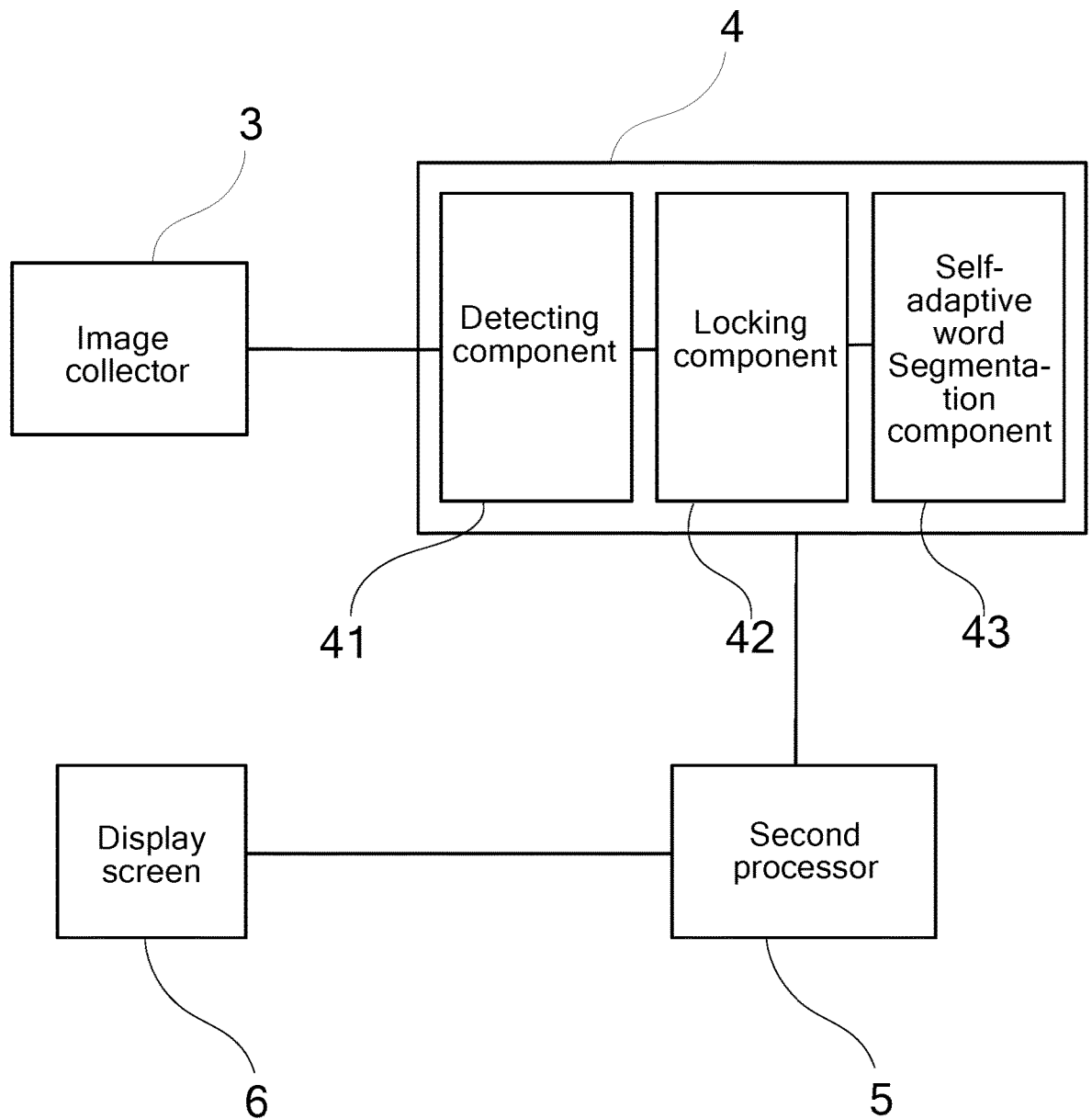
FIG. 3 is a schematic connection diagram of respective devices in another translation pen, in accordance with some embodiments of the present disclosure.

In some embodiments, as shown in FIG. 3, the first processor 4 includes a detecting component 41 and a locking component 42.

Figure 5:
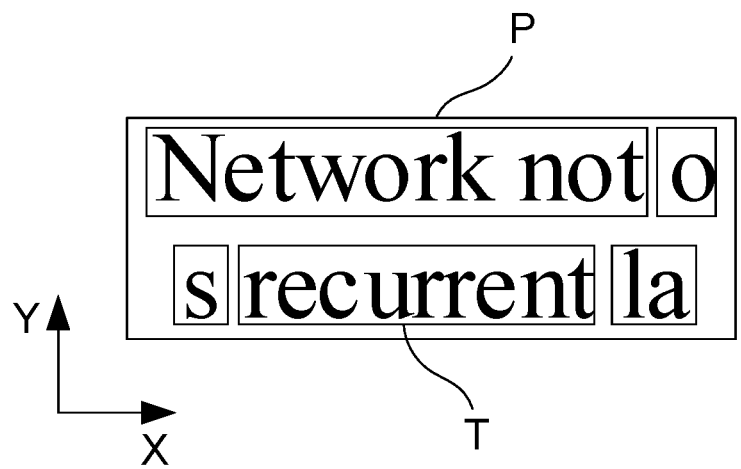
FIG. 5 is a schematic diagram of a detected image for a translation pen, in accordance with some embodiments of the present disclosure.

The detecting component 41 is electrically connected to the image collector 3, and the image collector 3 sends the collected image including the text to be translated to the detecting component 41. The detecting component 41 is configured to: detect the image including the text to be translated and form at least one text box in the image including the text to be translated as shown in FIG. 5, where the text box contains partial text in the image including the text to be translated. A case where a plurality of text boxes T are formed is shown in FIG. 5.

The locking component 42 is electrically connected to the detecting component 41. The locking component 42 is configured to: lock a text box that meets a setting requirement from the at least one formed text box according to the setting requirement, and take a text in the locked text box as the text to be translated.

Figure 6:
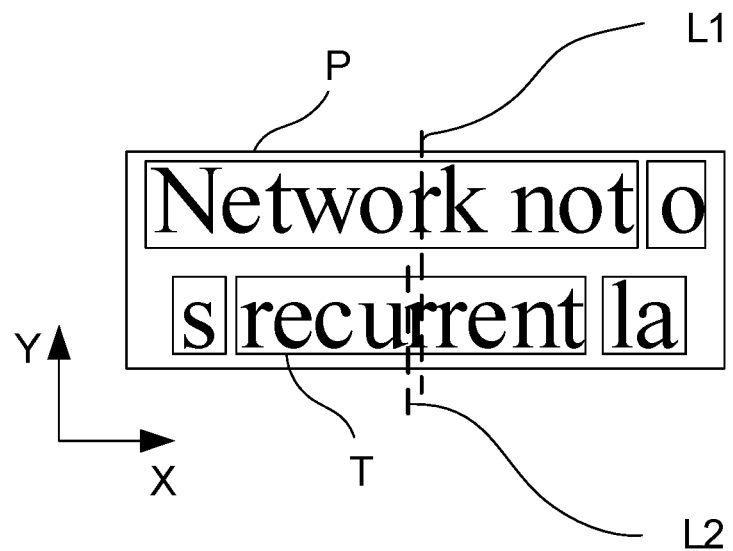
FIG. 6 is a schematic diagram illustrating that a translation pen locks a text to be translated, in accordance with some embodiments of the present disclosure.

As shown in FIGS. 4 and 6, the setting requirement is that, in a column direction Y of the text, a row where a text box T is located is a row closest to the indication component 2; in a row direction X of the text, a symmetric line L2 of the text box T is closest to a symmetric line L1 of an image P of the text to be translated. In FIG. 6, the text box T where "recurrent" is located meets the setting requirement, and thus "recurrent" is the text to be translated.

Or, as shown in FIGS. 4 and 7, in a case where the indication component 2 is capable of being used to color an external object, the setting requirement is that in the column direction Y of the text to be translated, the row where the text box T is located is the row closest to the indication component 2, where at least part of a region in the text box T is colored. In FIG. 7, the text box T where "recurrent" is located meets the setting requirement, and thus "recurrent" is the text to be translated.

It will be noted that, "the symmetric line L2 of the text box T" and "the symmetric line L1 of the image P of the text to be translated" herein are symmetric lines of the text box T and the image P of the text to be translated in the column direction Y, respectively.

A size of the "at least part of the region" in the "at least part of the region in the text box T is colored" may be set according to actual requirements, which is not specifically limited in the embodiments of the present disclosure. For example, an area of the colored region in the text box T may account for 70% to 100% of a total area of the text box T, such as 70%, 80%, 90% or 100%. That is, in the column direction Y of the text, the row where the text box T is located is closest to the indication component 2, and the area of the colored region in the text box T may account for 70% of the total area of the text box T.

In some embodiments, as shown in FIG. 3, the first processor 4 further includes a self-adaptive word segmentation component 43 electrically connected to the locking component 42. The self-adaptive word segmentation component 43 is configured to: calculate a threshold value of a spacing distance between adjacent letters in the text to be translated, according to a size of the locked text to be translated, and perform word segmentation on the locked text to be translated according to the threshold value.

A basic principle of a text detection network, such as Connectionist Text Proposal Network (CTPN) or You Only Look Once (YOLO), is to train a text detection network to make the text detection network be able to set a certain number of unit pixels (usually 16 unit pixels) in a row direction of letters to traverse the image, so that letter regions conforming to the setting are found, and the letter regions are combined into a complete text to be translated. In this method, whether a letter region is one word or a plurality of words is distinguished in a way that a threshold value of a spacing distance between two adjacent letters is preset, and if a value of an actual spacing distance between two adjacent letters is less than or equal to a threshold value of the spacing distance, it is determined that the two adjacent letters belong to a same word, otherwise, it is determined that they belong to two adjacent words respectively. However, in some scenes such as business cards or merchandise tags, letters with different font sizes may exist in a same text region. In these cases, only setting one preset threshold value of the spacing distance is not appropriate, that is, letters with larger or smaller font sizes (compared with a font size of letters with the preset threshold value of the spacing distance) cannot be accurately segmented.

The self-adaptive word segmentation component 43 of the translation pen 100 provided in the above embodiments of the present disclosure may calculate a threshold value of the spacing distance between adjacent letters in the text to be translated according to different font sizes of the text to be translated in the image including the text to be translated, so as to realize a function of adaptively adjusting the threshold value of the spacing distance, and then word segmentation is performed on the locked text to be translated according to the threshold value. In this way, the translation pen 100 is applicable to translations of words of various font sizes.

In some embodiments, as shown in FIG. 3, the translation pen 100 further includes a second processor 5 arranged in the pen body, and the second processor 5 is electrically connected to the first processor 4. The second processor 5 is configured to: receive the text to be translated recognized by the first processor 4, translate the text to be translated, generate a translation result and send it.

For example, the second processor 5 may be arranged in the pen body 1. In the case where the first processor 4 is arranged in the pen body 1, the second processor 5 may be integrated with the first processor 4 as one processor, or may be provided separately.

In some embodiments, as shown in FIGS. 1 and 2, the pen body 1 is provided with an observation window 7. The translation pen 100 further includes a display screen 6 arranged in the observation window 7 of the pen body 1, and the display screen 6 is electrically connected to the second processor 5. The display screen 6 is configured to: receive the translation result sent by the second processor 5 and display the translation result.

For example, the observation window 7 is an opening that penetrates a sidewall of the pen body 1, and the display screen 6 is embedded in the observation window 7, which may ensure a stable installation of the display screen 6. A display side of the display screen 6 is exposed outside the pen body 1, so as to facilitate the reading of the translation result displayed on the display screen 6.

Figure 9:
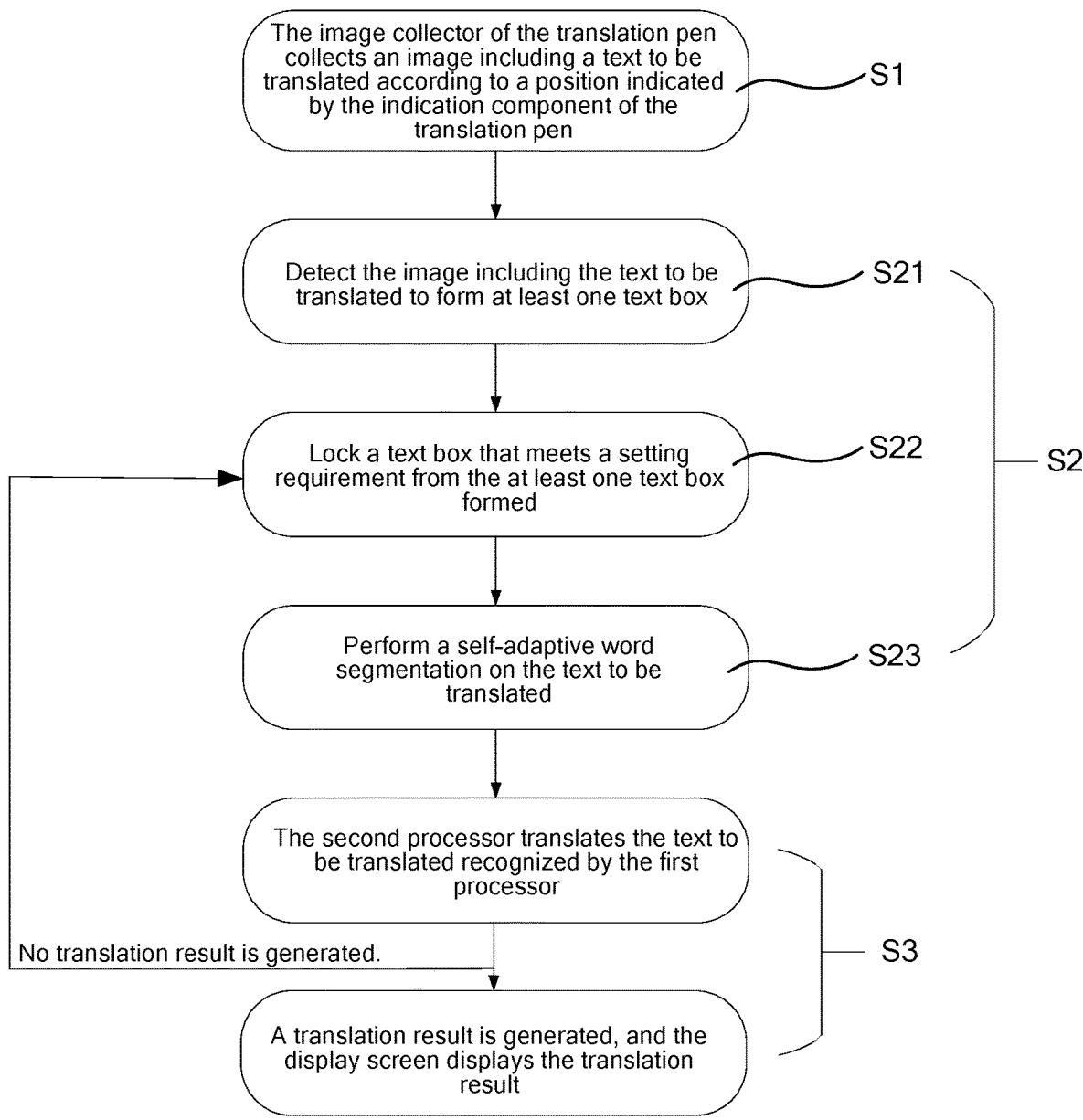
FIG. 9 is a flowchart of a control method applied to a translation pen, in accordance with some embodiments of the present disclosure.

Some embodiments of the present disclosure further provide a control method for the above translation pen 100. As shown in FIG. 9, the control method includes the following S1 to S2.

In S1, as shown in FIG. 4, the image collector 3 of the translation pen 100 collects an image P of a text to be translated according to a position indicated by the indication component 2 of the translation pen 100.

In S2, the first processor 4 of the translation pen 100 recognizes the text to be translated in the image P of the text to be translated.

In the control method provided by the above embodiments of the present disclosure, by operating the translation pen 100, the indication component 2 indicates a position where the image P of the text to be translated is located, the image collector 3 collects the image P of the text to be translated according to the position indicated by the indication component 2, and the first processor 4 recognizes the text to be translated in the collected image P of the text to be translated, which may improve an accuracy of the image collector 3 during a collection of the image, so that the first processor 4 may accurately recognize the text to be translated, and the translation accuracy of the translation pen 100 may be improved.

In some embodiments, as shown in FIG. 9, that the first processor 4 recognizes the text to be translated in the image includes the following S21 to S23.

In S21, the image including the text to be translated is detected to form at least one text box, where the text box contains partial text in the image including the text to be translated.

For example, as shown in FIG. 5, the text to be translated in the image P includes a plurality of letters and a plurality of text rows. The image P of the text to be translated is detected by the detecting component 51, a plurality of text boxes T are formed in the image P of the text to be translated, where a text box T contains partial text in the image P of the text to be translated, thereby facilitating subsequent locking of a text box T where the text to be translated is located, so as to realize the locking of the text to be translated.

In S22, a text box that meets a setting requirement is locked from the at least one formed text box, and a text in the locked text box is taken as the text to be translated.

For example, as shown in FIGS. 6 and 7, among the formed text boxes T, the locking component 52 of the first processor 4 locks the text box T that meets the setting requirement, and the locked text box T is taken as the text to be translated.

It will be noted that, as shown in FIG. 6, the above setting requirement is that, in a column direction Y of the text, a row where the text box T is located is a row closest to the indication component 2, and in a row direction X of the text, a symmetric line L2 of the text box T is closest to a symmetric line L1 of the image P of the text to be translated. Or, as shown in FIG. 7, in the case where the indication component 2 is able to be used to color an external object, the setting requirement is that in the column direction Y of the text, the row where the text box T is located is the row closest to the indication component 2, where at least part of a region in the text box T is colored.

In some embodiments, if the above setting requirement is that, in the column direction Y of the text, the row of the text box T is the row closest to the indication component 2, and in the row direction X of the text, the symmetric line L2 of the text box T is closest to the symmetric line L1 of the image P of the text to be translated, that the text box T that meets the setting requirement is locked from the at least one formed text box T (i.e., S22) includes the following steps.

(1) In the image P of the text to be translated, a text row closest to the indication component 2 in the column direction Y of the text is selected.

For example, as shown in FIGS. 4 and 5, the text row closest to the indication component 2 in the column direction Y of the text is selected, i.e., the text row where "s recurrent la" is located in the figure.

(2) Symmetric lines of text boxes T in the selected text row and the symmetric line L1 of the image P of the text to be translated are determined, and a text box T whose symmetric line is closest to the symmetric line L1 of the image P of the text to be translated is locked.

For example, as shown in FIG. 6, by determining symmetric lines of text boxes T where "s", "recurrent" and "la" are located in the text row where "s recurrent la" is located, and the symmetric line L1 of the image P of the text to be translated, it can be known that the symmetric line L2 of the text box T where "recurrent" is located is closest to the symmetric line L1, as such, the text box T where "recurrent" is located is locked.

In some embodiments, if the indication component 2 is capable of being used to color an external object, the setting requirement is that, in the column direction Y of the text, the row where the text box T is located is the row closest to the indication component 2, and at least part of the region in the text box T is colored, that the text box T that meets the setting requirement is locked from the at least one formed text box T (i.e., S22) includes the following steps.

(1) The text row closest to the indication component 2 in the column direction Y of the text is selected.

For example, as shown in FIGS. 4 and 7, the text row closest to the indication component 2 in the column direction Y of the text is selected, i.e., the text row where "s recurrent la" is located in the figure.

(2) A text box T where at least part of the region in the text box T is colored is locked.

For example, as shown in FIG. 7, in the text boxes T where "s", "recurrent" and "la" are located in the text row where "s recurrent la" is located, a region in the text box T where "recurrent" is located is colored, as such, the text box T where "recurrent" is located is locked.

In some embodiments, as shown in FIG. 9, after the text in the locked text box is taken as the text to be translated, i.e., after the S22, the control method applied to the translation pen 100 further includes:

S23, performing self-adaptive word segmentation on the text to be translated.

Figure 10:
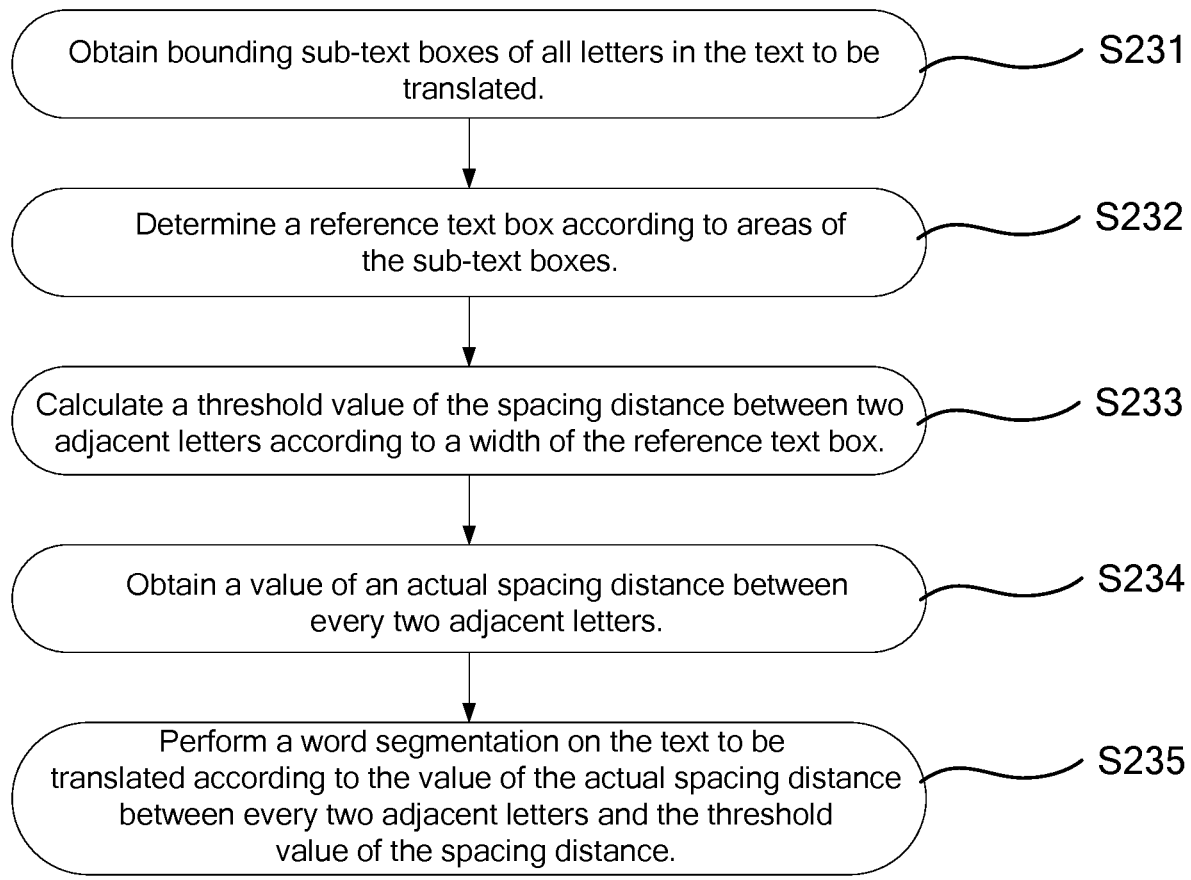
FIG. 10 is a flowchart of a self-adaptive word segmentation in a control method, in accordance with some embodiments of the present disclosure.

For example, as shown in FIG. 10, S23 includes the following steps.

In S231, a bounding sub-text box of each letter in the text to be translated is obtained.

Figure 11:
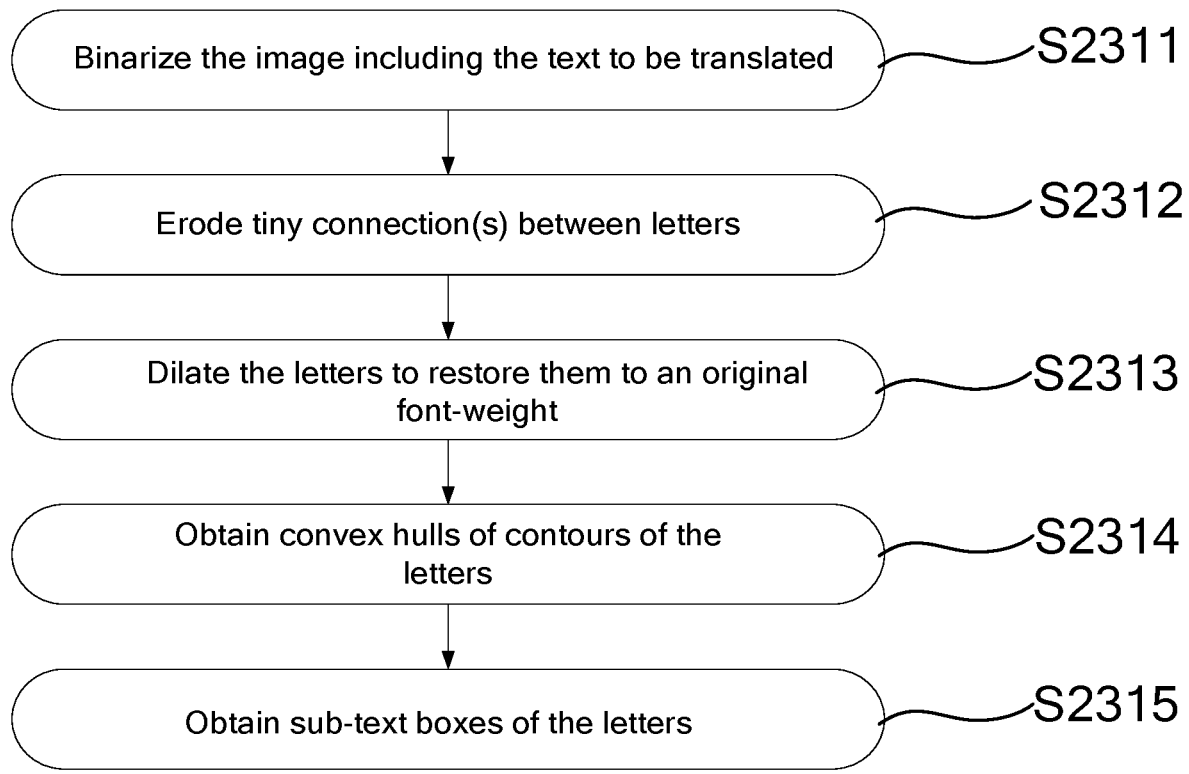
FIG. 11 is a flowchart of obtaining a sub-text box in a control method, in accordance with some embodiments of the present disclosure.

Optionally, as shown in FIG. 11, the bounding sub-text box of each letter in the text to be translated may be obtained through the following S2311 to S2315.

In S2311, the image including the text to be translated is binarized.

Figure 12:

For example, an opencv function cv::threshold( ) may be used to binarize the collected image including the text to be translated to obtain a binary image including the text to be translated shown in FIG. 12.

In S2312, tiny connection(s) between letters are eroded.

For example, an erosion image processing function cv::erode( ) may be used to remove the tiny connection(s) between the letters of the text to be translated due to an ink printing problem in the binary image including the text to be translated. For example, FIG. 12 shows that a tiny connection (shown by a dashed ellipse in FIG. 12) exists between the two letters "N" in "CNN". By using the processing function of eroding the image cv::erode( ), the tiny connection between the two letters "N" is removed.

In the above process of removing the tiny connection between the letters of the text to be translated, the processing function of eroding the image cv::erode( ) may also erode the text to be translated, resulting in thinning the text to be translated. For this, the problem may be solved through the following S2313.

In S2313, the letters are dilated to restore them to an original font-weight.

For example, a processing function of dilating image cv::dilate( ) may be used to dilate the letters in the text to be translated, so as to restore the letters to their original font-weight, i.e., a font-weight before the letters are eroded. FIG. 13 shows an effect that the text to be translated is removed the tiny connection between the two letters "N" and morphology of the letters in the text to be translated is transformed (restoring the font-weight).

In S2314, convex hulls of contours of the letters are obtained.

For example, as shown in FIG. 14, a function cv::findContours( ) may be used to find a contour of each letter in the text to be translated, and a function cv::convexHull( ) may be used to obtain a convex hull 21 of the contour. FIG. 14 shows that convex hulls 21 of contours of two letters "N" are obtained.

In S2315, sub-text boxes of the letters are obtained.

For example, as shown in FIG. 15, a minimum bounding rectangle of a convex hull 21 of a contour of each letter is calculated to obtain a sub-text box 22 of the letter, and the minimum bounding rectangle is a sub-text box 22 of the letter.

In S232, a reference text box is determined according to areas of the respective sub-text boxes 22.

For example, according to the areas of the sub-text boxes 22 of the letters, the sub-text boxes 22 are sorted according to a size order of areas of the sub-text boxes, and a sub-text box 22, a sub-text box whose area is in an intermediate range is selected as the reference text box.

It will be noted that, a difference between a lower limit value of the intermediate range and a minimum area value of the sub-text boxes 22 is equal to or approximately equal to a difference between an upper limit value of the intermediate range and a maximum area value of the sub-text boxes 22. The "intermediate range" may also be a fixed intermediate value. In this case, a difference between the intermediate value and the minimum area value of the sub-text boxes 22 is equal to a difference between the intermediate value and the maximum area value of the sub-text boxes 22.

Through the above method, the sub-text box 22 whose area value is in the intermediate range is selected, and the sub-text box 22 is used as the reference text box, in this way, smaller letters in the image including the text to be translated (e.g., the letters "i" and "t" shown in FIG. 14) and two letters with tiny connection (e.g., the two letters "N" in FIG. 12) may be excluded, which may avoid an influence on subsequent calculation of the threshold value of the spacing distance.

In S233, the threshold value of the spacing distance between two adjacent letters is calculated according to a width of the reference text box.

For example, the threshold value of the spacing distance between the two adjacent letters is calculated according to the following formula:

$$N = 0.6 \times \frac{W}{16},$$

where N is the threshold value of the spacing distance between two adjacent letters; W is a ratio of the width of the reference text box (a size of the reference text box in the row direction of the text) to a width of a unit pixel in an image; 0.6 is an empirical coefficient value obtained by the inventors of the present disclosure through many experiments, 16 is a width of 16 unit pixels set by the commonly used text detection network CTPN or YOLO in the row direction X.

In S234, a value of an actual spacing distance between every two adjacent letters is obtained.

In S235, the text to be translated is segmented according to the value of the actual spacing distance between every two adjacent letters and the threshold value of the spacing distance.

For example, if the value of the actual spacing distance is greater than the threshold value of the spacing distance, it is determined that the two adjacent letters belong to two adjacent words, respectively. If the value of the actual spacing distance is less than or equal to the threshold value of the spacing distance, it is determined that two adjacent letters belong to the same word. In this way, the letters of the text to be translated are grouped into at least one word, and the word segmentation is realized.

In some embodiments, as shown in FIG. 9, in the case where the translation pen 100 further includes the second processor 5 and the display screen 6, after the first processor 4 recognizes the text to be translated in the image including the text to be translated, i.e., after S2, the control method applied to the translation pen 100 further includes the following step.

In S3, the second processor 5 translates the text to be translated recognized by the first processor 4 to generate a translation result, and the display screen 6 displays the translation result.

If the second processor 5 fails to generate a translation result, the first processor 4 re-recognizes a text to be translated in the image including the text to be translated, and the re-recognized text to be translated is not a text to be translated recognized latest.

Figure 8:
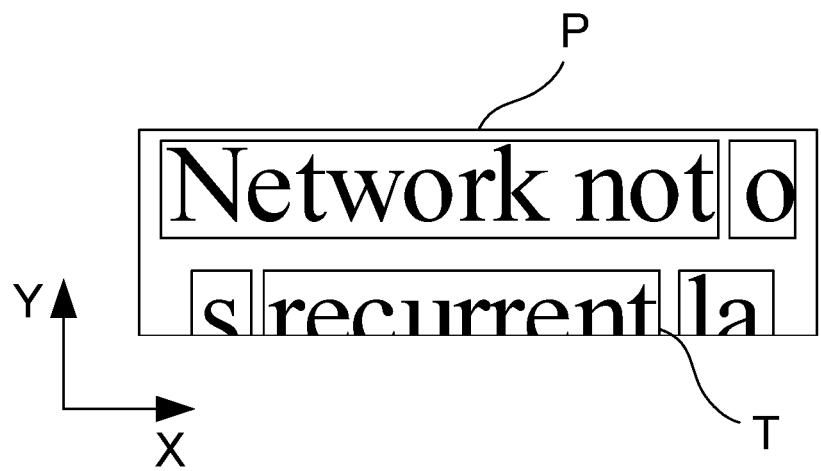
FIG. 8 is a schematic diagram illustrating that a translation pen collects an invalid text, in accordance with some embodiments of the present disclosure.

For example, as shown in FIG. 8, when the image collector 3 collects images, it may be affected by external factors such as the hand trembling of an operator, resulting in that only part of the text to be translated is collected in the locked text box, and thus the text to be translated in the locked text box is invalid text (the "recurrent" in the locked text box in FIG. 8 is an invalid text), which causes the translation pen 100 to fail to generate a translation result.

In this case, the first processor 4 re-recognizes the text to be translated in the image including the text to be translated. For example, in the column direction Y of the text, in addition to a row where the "recurrent" is located, a row closest to the indication component 2, i.e., a row where text boxes of "Network not" and "o" are located is locked, and in the row direction X of the text, according to the principle that a symmetric line of a text box is closest to the symmetric line of the image including the text to be translated, a text box of "Network not" is locked, and the "Network not" is the re-recognized text to be translated.

The above descriptions are merely specific implementation manners of the present disclosure, but the protection scope of the present disclosure is not limited thereto, and changes or replacements that any person skilled in the art could conceive of within the technical scope of the present disclosure shall be within the protection scope of the present disclosure. Therefore, the protection scope of the present disclosure shall be subject to the protection scope of the claims.

What is claimed is:

1. A translation pen, comprising:
   a pen body having a pen tip end;
   an indication component arranged on the pen tip end of the pen body;
   an image collector arranged on the pen body, the image collector configured to: collect an image including a text to be translated according to a position indicated by the indication component, and send the collected image including the text to be translated; and
   a first processor arranged in the pen body and electrically connected to the image collector, the first processor configured to: receive the image including the text to be translated sent by the image collector, and recognize the text to be translated in the image; the first processor is further configured to:
   detect the image including the text to be translated to form at least one text box, the at least one text box containing partial text in the image including the text to be translated; and
   lock a text box that meets a setting requirement from the at least one text box formed, and take a text in the locked text box as the text to be translated;
   wherein the setting requirement is such that, in a column direction of the text, a row where the text box that meets the setting requirement is located is a row closest to the indication component; and in a row direction of the text, a symmetric line of the text box that meets the setting requirement is closest to a symmetric line of the image including the text to be translated; or
   the indication component is capable of coloring, and the setting requirement is such that, in a column direction of the text, a row where the text box that meets the setting requirement is located is the row closest to the indication component, and at least part of a region in the text box that meets the setting requirement is colored.

2. The translation pen according to claim 1, wherein the pen body further has a pen tail end opposite to the pen tip end;
   the image collector is arranged on a side face of the pen body, and in a direction pointing from the pen tip end to the pen tail end of the pen body, the image collector is farther away from the pen tip end than the indication component; and
   the indication component is arranged within a viewing angle range of the image collector.

3. The translation pen according to claim 2, wherein the image collector and the indication component have a spacing therebetween.

4. The translation pen according to claim 1, wherein the indication component is capable of coloring.

5. The translation pen according to claim 1, wherein the indication component has a tip.

6. The translation pen according to claim 1, wherein the first processor is further configured to: calculate a threshold value of a spacing distance between adjacent letters in the text to be translated according to a size of a locked text to be translated, and perform word segmentation on the locked text to be translated according to the threshold value.

7. The translation pen according to claim 1, further comprising:
   a second processor arranged in the pen body, and electrically connected to the first processor, wherein
   the second processor is configured to: receive the text to be translated recognized by the first processor, translate the text to be translated to generate a translation result, and send the translation result.

8. The translation pen according to claim 7, wherein the pen body is provided with an observation window thereon; the translation pen further comprises:
   a display screen arranged in the observation window of the pen body, the display screen electrically connected to the second processor; wherein
   the display screen is configured to: receive the translation result sent by the second processor, and display the translation result.

9. A control method applied to the translation pen according to claim 1, the control method comprising:
   collecting, by the image collector of the translation pen, the image including the text to be translated according to the position indicated by the indication component of the translation pen; and
   recognizing, by the first processor of the translation pen, the text to be translated in the image, wherein recognizing, by the first processor, the text to be translated in the image includes:
   detecting the image including the text to be translated to form the at least one text box, the at least one text box containing the partial text in the image including the text to be translated; and
   locking the text box that meets the setting requirement from the at least one formed text box, and taking the text in the text box locked as the text to be translated,
   wherein locking the text box that meets the setting requirement from the at least one formed text box includes:
   selecting a text row closest to the indication component in a column direction of the text;
   determining a symmetric line of each text box in the text row selected, and the symmetric line of the image including the text to be translated; and
   locking the text box whose symmetric line is closest to the symmetric line of the image including the text to be translated; or
   wherein the indication component is capable of coloring; and locking the text box that meets the setting requirement from the at least one formed text box includes:
   selecting a text row closest to the indication component in a column direction of the text; and
   locking a text box in which at least part of a region is colored.

10. The control method according to claim 9, wherein after the text in the locked text box is taken as the text to be translated, the control method further comprises:
    performing a self-adaptive word segmentation on the text to be translated.

11. The control method according to claim 10, wherein performing the self-adaptive word segmentation on the text to be translated includes:
- obtaining bounding sub-text boxes of all letters in the text to be translated;
- determining a reference text box according to areas of the bounding sub-text boxes;
- calculating a threshold value of a spacing distance between two adjacent letters according to a width of the reference text box;
- obtaining a value of an actual spacing distance between every two adjacent letters; and
- performing the self-adaptive word segmentation on the text to be translated according to the value of the actual spacing distance between every two adjacent letters and the threshold value of the spacing distance.

12. The control method according to claim 11, wherein determining the reference text box according to areas of the bounding sub-text boxes includes:
- selecting a sub-text box whose area value is within an intermediate range from areas of the bounding sub-text boxes, and taking the sub-text box selected as the reference text box;
- wherein a difference between a lower limit value of the intermediate range and a minimum area value of the bounding sub-text boxes is approximately equal to a difference between an upper limit value of the intermediate range and a maximum value of the bounding sub-text boxes.

13. The control method according to claim 11, wherein calculating the threshold value of the spacing distance between two adjacent letters according to the width of the reference text box includes:
- calculating the threshold value of the spacing distance between two adjacent letters according to a following formula:

$$N = 0.6 \times \frac{W}{16},$$

wherein N is the threshold value of the spacing distance between two adjacent letters, and W is a ratio of the width of the reference text box to a width of a unit pixel in the image.

14. The control method according to claim 11, wherein performing the self-adaptive word segmentation on the text to be translated according to the value of the actual spacing distance between every two adjacent letters and the threshold value of the spacing distance between two adjacent letters includes:
- determining whether a value of the actual spacing distance between two adjacent letters is greater than the threshold value;
- if the value of the actual spacing distance between the two adjacent letters is greater than the threshold value of the spacing distance, determining that the corresponding two adjacent letters belong to two adjacent words, respectively; and
- if the value of the actual spacing distance between the two adjacent letters is less than or equal to the threshold value of the spacing distance, determining that the corresponding two adjacent letters belong to a same word.

15. The control method according to claim 9, wherein the translation pen further includes a second processor and a display screen;
- after the first processor recognizes the text to be translated in the image, the control method further comprises:
  - translating, by the second processor, the text to be translated recognized by the first processor to generate a translation result; and
  - displaying, by the display screen, the translation result.

16. The control method according to claim 15, further comprising:
- if the second processor fails to generate the translation result, re-recognizing, by the first processor, another text to be translated in the image, the re-recognized text to be translated not being a latest recognized text to be translated.

* * * * *